(12) United States Patent
Zhu et al.

(10) Patent No.: US 12,135,900 B2
(45) Date of Patent: Nov. 5, 2024

(54) MEMORY POLLING METHOD, MEMORY STORAGE DEVICE AND MEMORY CONTROL CIRCUIT UNIT

(71) Applicant: Hefei Core Storage Electronic Limited, Anhui (CN)

(72) Inventors: Qi-Ao Zhu, Anhui (CN); Jing Zhang, Anhui (CN); Kuai Cao, Anhui (CN); Xin Wang, Anhui (CN); Xu Hui Cheng, Anhui (CN); Wan-Jun Hong, Anhui (CN)

(73) Assignee: Hefei Core Storage Electronic Limited, Anhui (CN)

(*) Notice: Subject to any disclaimer, the term of this patent is extended or adjusted under 35 U.S.C. 154(b) by 334 days.

(21) Appl. No.: 17/500,901

(22) Filed: Oct. 13, 2021

(65) Prior Publication Data
US 2023/0098366 A1    Mar. 30, 2023

(30) Foreign Application Priority Data

Sep. 28, 2021   (CN) .......................... 202111146180.0

(51) Int. Cl.
    G06F 3/06    (2006.01)
(52) U.S. Cl.
    CPC .......... G06F 3/0659 (2013.01); G06F 3/0605 (2013.01); G06F 3/0652 (2013.01); G06F 3/0653 (2013.01); G06F 3/0679 (2013.01)
(58) Field of Classification Search
    CPC .... G06F 3/0659; G06F 3/0605; G06F 3/0652; G06F 3/0653; G06F 3/0679
    See application file for complete search history.

(56) References Cited

U.S. PATENT DOCUMENTS

| | | | |
|---|---|---|---|
| 8,527,626 B1 | 9/2013 | Wang et al. | |
| 10,140,027 B1* | 11/2018 | Canepa | G06F 13/16 |
| 2009/0198919 A1* | 8/2009 | Ji | G06F 3/0634 |
| | | | 711/E12.001 |
| 2017/0092366 A1* | 3/2017 | Hwang | G06F 3/0616 |

(Continued)

FOREIGN PATENT DOCUMENTS

| | | |
|---|---|---|
| CN | 105339916 | 2/2016 |
| CN | 108228075 | 6/2018 |

(Continued)

OTHER PUBLICATIONS

Shin, Dong In, et al. "Dynamic Interval Polling and Pipelined Post {I/O} Processing for {Low-Latency} Storage Class Memory." 5th USENIX Workshop on Hot Topics in Storage and File Systems (HotStorage 13). 2013. (Year: 2013).*

(Continued)

Primary Examiner — Nicholas J Simonetti
(74) Attorney, Agent, or Firm — JCIPRNET

(57) ABSTRACT

A memory polling method, a memory storage device and a memory control circuit unit are provided. The memory polling method includes: detecting a plurality of busy times corresponding to a plurality of physical units when executing a plurality of first commands; counting the busy times corresponding to the physical units to generate a count statistic value, and determine a delay time based on the count statistic value; and transmitting a plurality of status requests to a rewritable non-volatile memory module after the delay time.

18 Claims, 5 Drawing Sheets

```
detecting a plurality of busy times corresponding to the
plurality of physical units when executing a plurality of     ~ S802
                    first commands
                            │
                            ▼
counting the plurality of busy times corresponding to the
  plurality of physical units to generate a count statistic   ~ S804
value, and determining a delay time according to the count
                    statistic value
                            │
                            ▼
 transmitting a status request to the rewritable non-volatile ~ S806
         memory module after the delay time
```

(56) References Cited

U.S. PATENT DOCUMENTS

| | | | |
|---|---|---|---|
| 2017/0115891 A1* | 4/2017 | O'Krafka | G06F 3/0629 |
| 2019/0012173 A1 | 1/2019 | Mirichigni et al. | |
| 2019/0079697 A1* | 3/2019 | Suzuki | G06F 3/0659 |
| 2020/0026428 A1 | 1/2020 | Vithalkar et al. | |
| 2020/0401339 A1* | 12/2020 | Sun | G06F 3/0659 |
| 2021/0051721 A1 | 2/2021 | Baron et al. | |
| 2023/0024167 A1* | 1/2023 | Lee | G06F 3/061 |

FOREIGN PATENT DOCUMENTS

| | | |
|---|---|---|
| CN | 108932110 | 12/2018 |
| CN | 111078146 | 4/2020 |
| CN | 111554340 | 8/2020 |
| CN | 112130753 | 12/2020 |
| TW | 200935297 | 8/2009 |
| TW | 201901440 | 1/2019 |
| TW | 202046114 | 12/2020 |

OTHER PUBLICATIONS

Chen, Renhai, et al. "Delay-based I/O request scheduling in SSDs." Journal of Systems Architecture 98 (2019): 434-442. (Year: 2019).*
"Office Action of Taiwan Counterpart Application", issued on Jul. 15, 2022, p. 1-p. 7.
"Office Action of China Counterpart Application", issued on Sep. 25, 2023, p. 1-p. 15.
"Office Action of Taiwan Counterpart Application", issued on Feb. 26, 2024, p. 1-p. 14.

* cited by examiner

MEMORY POLLING METHOD, MEMORY STORAGE DEVICE AND MEMORY CONTROL CIRCUIT UNIT

CROSS-REFERENCE TO RELATED APPLICATION

This application claims the priority benefit of China application serial no. 202111146180.0, filed on Sep. 28, 2021. The entirety of the above-mentioned patent application is hereby incorporated by reference herein and made a part of this specification.

BACKGROUND

Technical Field

The disclosure relates to a memory management technology, and particularly relates to a memory polling method, a memory storage device, and a memory control circuit unit.

Description of Related Art

Digital cameras, mobile phones, and MP3 players have undergone rapid development over the past few years, resulting in a rapid increase in consumers' demand for storage media. As the rewritable non-volatile memory module (for example, flash memory) is characterized in non-volatile data, power saving, small size, and non-mechanical structure, it is very suitable for being embedded in the various portable multimedia devices mentioned above.

During the use of such a memory storage device with a rewritable non-volatile memory module, the controller of the memory may need to wait for a command to be completed before executing another command of the same memory die. Generally speaking, the controller can check the status of the memory die through the ready/busy pin or through the status command, such as being in the ready status or busy status.

When checking the status of the memory die through the status command, the controller will use status polling to repeatedly transmit a status request to the memory die at a specific frequency or interval polling time to determine whether the memory die is busy. However, repeatedly transmitting too many status requests will occupy too much resources of the controller, which will not only increase the power consumption of the memory storage device, but also increase the temperature of the memory storage device. When the temperature reaches a certain level, the system will be in an abnormal operation status, which will affect the performance and user experience of the memory storage device. Therefore, how to reduce the energy consumption during the operation of the memory storage device is a problem to be solved in the art.

SUMMARY

The disclosure provides a memory polling method, a memory storage device, and a memory control circuit unit, which can reduce the power consumption of the memory storage device.

An exemplary embodiment of the disclosure provides a memory polling method for a memory storage device including a rewritable non-volatile memory module. The rewritable non-volatile memory module includes a plurality of physical units. The memory polling method includes: detecting a plurality of busy times corresponding to the plurality of physical units when executing a plurality of first commands; counting the plurality of busy times corresponding to the plurality of physical units to generate a count statistic value, and determining a delay time according to the count statistic value; and transmitting a status request to the rewritable non-volatile memory module after the delay time.

In an exemplary embodiment of the disclosure, the above-mentioned first command includes at least one of a write command, an erase command, and a read command.

In an exemplary embodiment of the disclosure, the plurality of physical units includes a plurality of physical programming units, and the step of counting the plurality of busy times corresponding to the plurality of physical units to generate the count statistic value includes: calculating the average count of the plurality of busy times corresponding to the plurality of physical programming units that logically belong to the same physical erasing unit, and setting the average count to be the busy time corresponding to the physical erasing unit; and counting the plurality of busy times corresponding to the plurality of physical erasing units to generate the count statistic value.

In an exemplary embodiment of the disclosure, the plurality of physical units includes a plurality of physical programming units, and the step of counting the plurality of busy times corresponding to the plurality of physical units to generate the count statistic value includes: counting the plurality of busy times corresponding to the plurality of physical programming units to generate the count statistic value.

In an exemplary embodiment of the disclosure, the count statistic value is at least one of the mode and the median of the plurality of busy times corresponding to the plurality of physical units.

In an exemplary embodiment of the disclosure, the memory polling method further includes: setting at least one of the mode and the median to be the delay time based on the product characteristics of the memory storage device.

In an exemplary embodiment of the disclosure, the memory polling method further includes: determining the frequency of updating the delay time according to a preset count of command executions or a preset time period, and the preset count of command executions is the count of completed command executions.

An exemplary embodiment of the disclosure provides a memory storage device, including a connection interface unit, a rewritable non-volatile memory module, and a memory control circuit unit. The connection interface unit is configured for coupling to the host system. The rewritable non-volatile memory module includes a plurality of physical units. The memory control circuit unit is coupled to the connection interface unit and the rewritable non-volatile memory module. The memory control circuit unit is configured to detect a plurality of busy times corresponding to a plurality of physical units when executing a plurality of first commands. The memory control circuit unit is further configured to count a plurality of busy times corresponding to the plurality of physical units to generate a count statistic value, and determine a delay time according to the count statistic value. Moreover, the memory control circuit unit is further configured to transmit a status request to the rewritable non-volatile memory module after the delay time.

In an exemplary embodiment of the disclosure, the first command includes at least one of a write command, an erase command, and a read command.

In an exemplary embodiment of the disclosure, the plurality of physical units includes a plurality of physical programming units, and the operation of counting the plurality of busy times corresponding to the plurality of physical units to generate the count statistic value includes: calculating the average count of the plurality of busy times corresponding to the plurality of physical programming units that logically belong to the same physical erasing unit, and setting the average count to be the busy time corresponding to the physical erasing unit; and counting the plurality of busy times corresponding to the plurality of physical erasing units to generate the count statistic value.

In an exemplary embodiment of the disclosure, the plurality of physical units includes a plurality of physical programming units, and the operation of counting the plurality of busy times corresponding to the plurality of physical units to generate the count statistic value includes: counting the plurality of busy times corresponding to the plurality of physical programming units to generate the count statistic value.

In an exemplary embodiment of the disclosure, the count statistic value is at least one of the mode and the median of the plurality of busy times corresponding to the plurality of physical units.

In an exemplary embodiment of the disclosure, the memory control circuit unit is further configured to set at least one of the mode and the median to be the delay time based on the product characteristics of the memory storage device.

In an exemplary embodiment of the disclosure, the memory control circuit unit is further configured to determine the frequency of updating the delay time according to a preset count of command executions or a preset time period, and the preset count of command executions is the count of completed command executions.

An exemplary embodiment of the disclosure provides a memory control circuit unit for controlling a memory storage device including a rewritable non-volatile memory module. The rewritable non-volatile memory module includes a plurality of physical units. The memory control circuit unit includes a host interface, a memory interface, and a memory management circuit. The host interface is configured for coupling to a host system. The memory interface is configured for coupling to the rewritable non-volatile memory module. The memory management circuit is coupled to the host interface and the memory interface. The memory management circuit is configured for detecting a plurality of busy times corresponding to the plurality of physical units when executing a plurality of first commands. The memory management circuit is further configured to count a plurality of busy times corresponding to the plurality of physical units to generate a count statistic value, and determine the delay time according to the count statistic value. Moreover, the memory management circuit is further configured to transmit a status request to the rewritable non-volatile memory module after the delay time.

In an exemplary embodiment of the disclosure, the first command includes at least one of a write command, an erase command, and a read command.

In an exemplary embodiment of the disclosure, the plurality of physical units includes a plurality of physical programming units, and the operation of counting the plurality of busy times corresponding to the plurality of physical units to generate the count statistic value includes: calculating the average count of the plurality of busy times corresponding to the plurality of physical programming units that logically belong to the same physical erasing unit, and setting the average count to be the busy time corresponding to the physical erasing unit; and counting the plurality of busy times corresponding to the plurality of physical erasing units to generate the count statistic value.

In an exemplary embodiment of the disclosure, the plurality of physical units includes a plurality of physical programming units, and the operation of counting the plurality of busy times corresponding to the plurality of physical units to generate the count statistic value includes: counting the plurality of busy times corresponding to the plurality of physical programming units to generate the count statistic value.

In an exemplary embodiment of the disclosure, the count statistic value is at least one of the mode and the median of the plurality of busy times corresponding to the plurality of physical units.

In an exemplary embodiment of the disclosure, the memory management circuit is further configured to set at least one of the mode and the median to be the delay time based on the product characteristics of the memory storage device.

In an exemplary embodiment of the disclosure, the memory management circuit is further configured to determine the frequency of updating the delay time according to a preset count of command executions or a preset time period, and the preset count of command executions is the count of completed command executions.

Based on the above, the memory polling method, memory storage device, and memory control circuit unit provided by the disclosure can dynamically update the delay time for transmitting the status request according to the busy time corresponding to the physical unit when the memory storage device is operating, so that the delay time more accurately matches the actual status of the current memory storage device. In this way, the count and time of polling the memory status while waiting for the command to be completed can be reduced, thereby reducing the power consumption of the memory storage device and reducing the generation of heat, thereby reducing the temperature of the memory storage device.

In order to make the above-mentioned features and advantages of the present disclosure more comprehensible, the following specific embodiments are described in detail in conjunction with the accompanying drawings.

DESCRIPTION OF THE EMBODIMENTS

Generally speaking, a memory storage device (also known as a memory storage system) includes a rewritable non-volatile memory module and a controller (also known as a control circuit). Generally, the memory storage device is used together with the host system, so that the host system can write data to the memory storage device or read data from the memory storage device.

Figure 1:
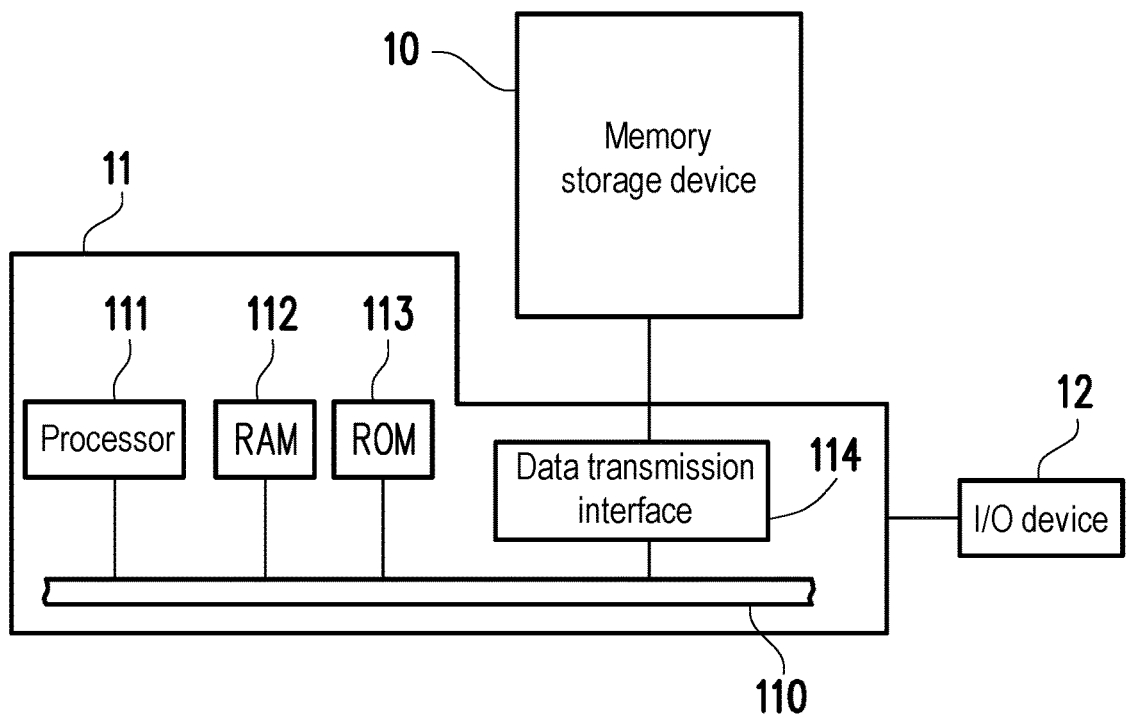
FIG. 1 is a schematic diagram of a host system, a memory storage device, and an input/output (I/O) device according to an exemplary embodiment of the disclosure.
Figure 2:
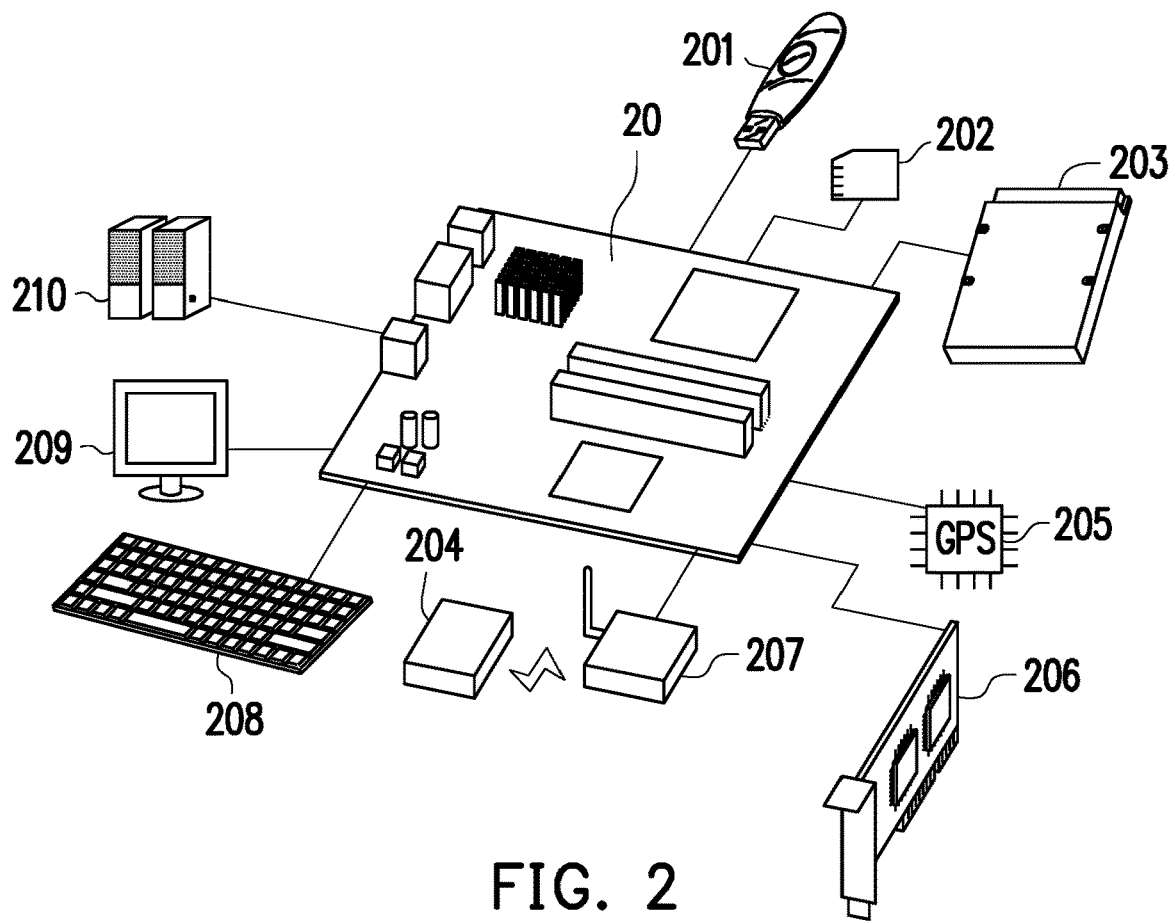
FIG. 2 is a schematic diagram of a host system, a memory storage device, and an input/output (I/O) device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an input/output (I/O) device according to another exemplary embodiment of the disclosure.

Please refer to FIG. 1 and FIG. 2, the host system 11 generally includes a processor 111, a RAM (random access memory) 112, a ROM (read only memory) 113 and a data transmission interface 114. The processor 111, the random access memory 112, the read-only memory 113, and the data transmission interface 114 are all coupled to a system bus 110.

In this exemplary embodiment, the host system 11 is coupled to the memory storage device 10 through the data transmission interface 114. For example, the host system 11 can store data to the memory storage device 10 or read data from the memory storage device 10 through the data transmission interface 114. In addition, the host system 11 is coupled to the I/O device 12 through the system bus 110. For example, the host system 11 can transmit output signals to the I/O device 12 or receive input signals from the I/O device 12 through the system bus 110.

In this exemplary embodiment, the processor 111, the random access memory 112, the read-only memory 113, and the data transmission interface 114 may be disposed on the motherboard 20 of the host system 11. The number of data transmission interfaces 114 may be one or more. Through the data transmission interface 114, the motherboard 20 can be coupled to the memory storage device 10 in a wired or wireless manner. The memory storage device 10 may be, for example, a flash drive 201, a memory card 202, a SSD (solid state drive) 203, or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, or a BLE (Bluetooth low energy) memory storage device (e.g., iBeacon). Further, the motherboard 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the motherboard 20 can access the wireless memory storage device 204 through the wireless transmission device 207.

Figure 3:
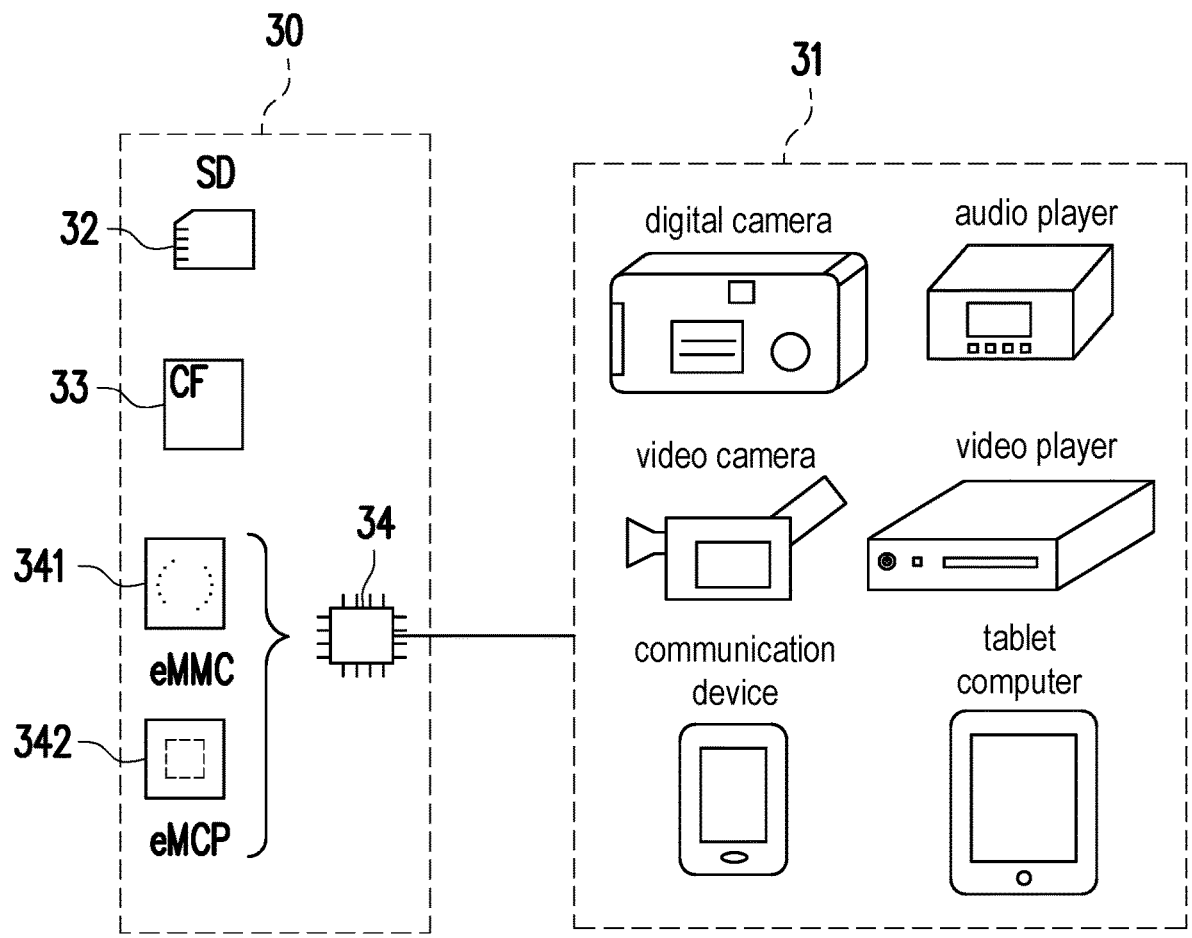
FIG. 3 is a schematic diagram of a host system and a memory storage device according to still another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, FIG. 3 is a schematic diagram illustrating a host system and a memory storage device according to another exemplary embodiment of the disclosure. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
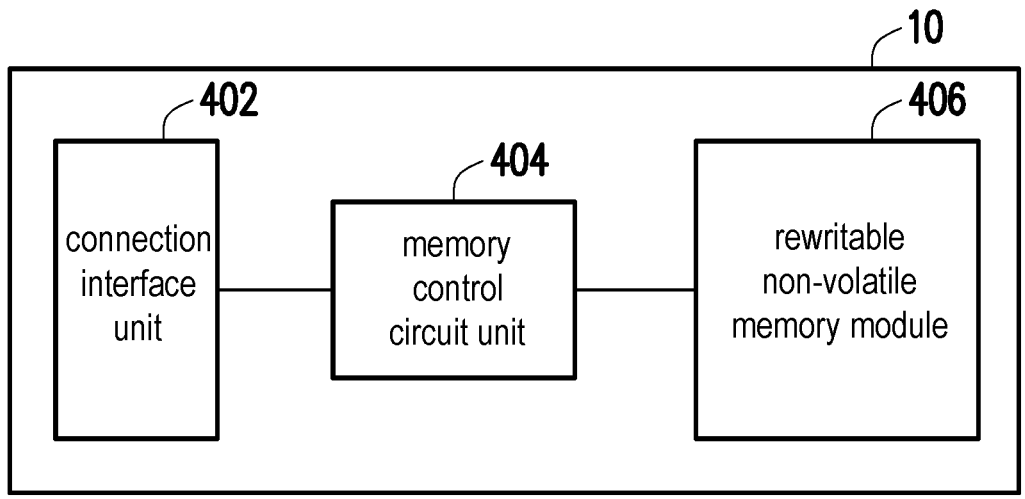
FIG. 4 is a schematic block diagram of a memory storage device according to an exemplary embodiment of the disclosure.

FIG. 4 is a schematic block diagram illustrating a memory storage device according to an exemplary embodiment of the disclosure. Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. The memory storage device 10 can communicate with the host system 11 through the connection interface unit 402. In the exemplary embodiment, the connection interface unit 402 is compatible with a SATA (Serial Advanced Technology Attachment) standard. Nevertheless, it should be understood that the disclosure is not limited thereto. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to perform multiple logic gates or control commands implemented in the form of hardware or firmware, and perform data writing, data reading, and data erasing in the rewritable non-volatile memory module 406 according to the commands of the host system 11.

The rewritable non-volatile memory module 406 is coupled to the memory control circuit unit 404 and configured to store data written by the host system 11. The rewritable non-volatile memory module 406 can be SLC (Single Level Cell) NAND flash memory module (i.e., in which one memory cell capable of storing one bit), a MLC (Multi Level Cell) NAND flash memory module (i.e., in which one memory cell capable of storing two bits), a TLC (Triple Level Cell) NAND flash memory module (i.e., in which one memory cell capable of storing three bits), a QLC (Quad Level Cell) NAND flash memory module (i.e., in which one memory cell capable of storing four bits), other flash memory modules or other types of memory modules with the same characteristics.

Each memory cell in the rewritable non-volatile memory module 406 stores one or multiple bits with a change in voltage (hereinafter also referred to as a threshold voltage). Specifically, there is a charge trapping layer between the control gate of each memory cell and the channel. By applying a write voltage to the control gate, the amount of electrons in the charge trapping layer can be changed, thereby changing the threshold voltage of the memory cell. This operation of changing the threshold voltage of the memory cell is also referred to as "writing data into the memory cell" or "programming the memory cell". As the threshold voltage changes, each memory cell in the rewritable non-volatile memory module 406 has a plurality of storage states. By applying the read voltage, it is possible to determine which storage state a memory cell belongs to, thereby obtaining one or a plurality of bits stored in the memory cell.

In this exemplary embodiment, the memory cells of the rewritable non-volatile memory module 406 can constitute a plurality of physical programming units, and these physical programming units can constitute a plurality of physical erasing units. Specifically, the memory cells on the same word line can form one or a plurality of physical programming units. If each memory cell can store 2 bits and more, the physical programming unit on the same word line can be at least classified into a lower physical programming unit and an upper physical programming unit. For example, the LSB (Least Significant Bit) of a memory cell belongs to the lower physical programming unit, and the MSB (Most Significant Bit) of a memory cell belongs to the upper physical programming unit. Generally speaking, in MLC NAND flash memory, the writing speed of the lower physical programming unit is higher than that of the upper physical programming unit, and/or the reliability of the lower physical programming unit is higher than that of the upper physical programming unit.

In this exemplary embodiment, the physical programming unit is the minimum unit for programming. That is, the physical programming unit is the minimum unit for writing data. For example, the physical programming unit can be a physical page or a physical sector. If the physical programming unit is a physical page, these physical programming units may include a data bit area and a redundancy bit area. The data bit area includes a plurality of physical sectors for storing user data, and the redundancy bit area is configured for storing system data (for example, management data such as error correction codes). In this exemplary embodiment, the data bit area includes 32 physical sectors, and the size of one physical sector is 512 bytes (B). However, in other exemplary embodiments, the data bit area can also include 8, 16, or more or less physical sectors, and the size of each physical sector can also be larger or smaller. On the other hand, the physical erasing unit is the minimum unit for erasing. That is, each physical erasing unit contains the smallest number of memory cells to be erased. For example, the physical erasing unit is a physical block. Each physical erasing unit may belong to the same memory die or belong to different memory dies respectively.

Figure 5:
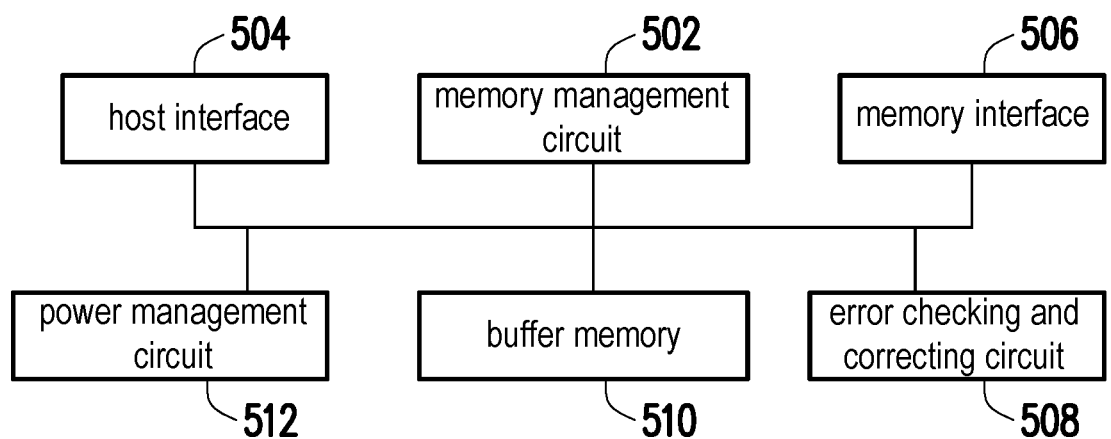
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands, and when the memory storage device 10 is operating, these control commands are executed to perform operations such as writing, reading, and erasing data. The following description of the operation of the memory management circuit 502 is equivalent to the description of the operation of the memory control circuit unit 404.

In this exemplary embodiment, the control command of the memory management circuit 502 is implemented in the form of firmware. For example, the memory management circuit 502 has a microprocessor unit (not shown) and a read-only memory (not shown), and these control commands are burned into the read-only memory. When the memory storage device 10 is operating, these control commands are executed by the microprocessor unit to perform data writing, reading, and erasing operations.

In another exemplary embodiment, the control command of the memory management circuit 502 can also be stored in a specific area of the rewritable non-volatile memory module 406 in the form of a program code (for example, the system area specifically for storing system data in the memory module). In addition, the memory management circuit 502 has a microprocessor unit (not shown), a read-only memory (not shown), and a random access memory (not shown). In particular, the read-only memory has a boot code, and when the memory control circuit unit 404 is enabled, the microprocessor unit will first execute the boot code to load the control command stored in the rewritable non-volatile memory module 406 into the random access memory of the memory management circuit 502. Thereafter, the microprocessor unit will run these control commands to perform data writing, reading, and erasing operations.

Moreover, in another exemplary embodiment, the control command of the memory management circuit 502 can also be implemented in the form of hardware. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit and the data processing circuit are coupled to the microcontroller. The memory cell management circuit is configured to manage the memory cell or the memory cell group of the rewritable non-volatile memory module 406. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured for processing data to be written to the rewritable non-volatile memory module 406 and processing data read from the rewritable non-volatile memory module 406. The write command sequence, the read command sequence, and the erase command sequence may each include one or a plurality of program codes or command codes and are configured to instruct the rewritable non-volatile memory module 406 to perform corresponding operations such as writing, reading and erasing. In an exemplary embodiment, the memory management circuit 502 can also issue other types of command sequences to the rewritable non-volatile memory module 406 to instruct the rewritable non-volatile memory module 406 to perform corresponding operations.

The host interface 504 is coupled to the memory management circuit 502. The memory management circuit 502 can communicate with the host system 11 through the host interface 504. The host interface 504 can be configured to receive and identify commands and data transmitted by the host system 11. For example, the command and data transmitted by the host system 11 can be transmitted to the memory management circuit 502 through the host interface 504. In addition, the memory management circuit 502 can transmit data to the host system 11 through the host interface 504. In this exemplary embodiment, the host interface 504 is compatible with the SATA standard. However, it should be understood that the disclosure is not limited thereto. The host interface 504 can also be compatible with PATA standard, IEEE 1394 standard, PCI Express standard, USB standard, SD standard, UHS-I standard, UHS-II standard, MS standard, MMC standard, eMMC standard, UFS standard, CF standard, IDE standard or other suitable data transmission standards.

The memory interface 506 is coupled to the memory management circuit 502 and configured to access the rewritable non-volatile memory module 406. In other words, the data to be written into the rewritable non-volatile memory module 406 is converted into a format acceptable by the rewritable non-volatile memory module 406 through the memory interface 506. Specifically, if the memory management circuit 502 needs to access the rewritable non-volatile memory module 406, the memory interface 506 will transmit a corresponding command sequence. For example, these command sequences may include a write command sequence instructing to write data, a read command sequence instructing to read data, an erase command sequence instructing to erase data, and corresponding command sequences configured for instructing to perform various memory operations (e.g., change the read voltage level or perform garbage collection operations, etc.) These command sequences are, for example, generated by the memory management circuit 502 and transmitted to the rewritable non-volatile memory module 406 through the memory interface 506. These command sequences can include one or a plurality of signals, or data on the bus. These signals or data can include command codes or program codes. For example, in the read command sequence, the read identification code, memory address and other information will be included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to perform error checking and correcting operations to ensure the correctness of the data. Specifically, when the memory management circuit 502 receives a write command from the host system 11, the error checking and correcting circuit 508 will generate a corresponding ECC (error correcting code) and/or EDC (error detecting code) for the data corresponding to the write command, and the memory management circuit 502 will write the data corresponding to the written command and the corresponding ECC and/or EDC to the rewritable non-volatile memory module 406. Thereafter, when the memory management circuit 502 reads data from the rewritable non-volatile memory module 406, the memory management circuit 502 will also read the ECC and/or EDC corresponding to the data, and the error check and correcting circuit 508 will perform error checking and correcting operation on the read data based on the ECC and/or EDC.

The buffer memory 510 is coupled to the memory management circuit 502 and configured to temporarily store data and commands from the host system 11 or data from the rewritable non-volatile memory module 406. In an exemplary embodiment, the buffer memory 510 may be a volatile memory, such as DRAM (dynamic random access memory), but the buffer memory 510 may also be a SRAM (static random access memory), MRAM (magnetoresistive random access memory), Cache RAM, SDRAM (synchronous dynamic random access memory), VRAM (Video RAM), eDRAM (embedded DRAM) or other memory. In another exemplary embodiment, the buffer memory 510 may be a non-volatile memory. The power management circuit 512 is coupled to the memory management circuit 502 and configured to control the power of the memory storage device 10.

In an exemplary embodiment, the rewritable non-volatile memory module 406 of FIG. 4 is also referred to as a flash memory module, and the memory control circuit unit 404 is also referred to as a flash memory controller for controlling the flash memory module. In an exemplary embodiment, the memory management circuit 502 of FIG. 5 is also referred to as a flash memory management circuit.

Figure 6:
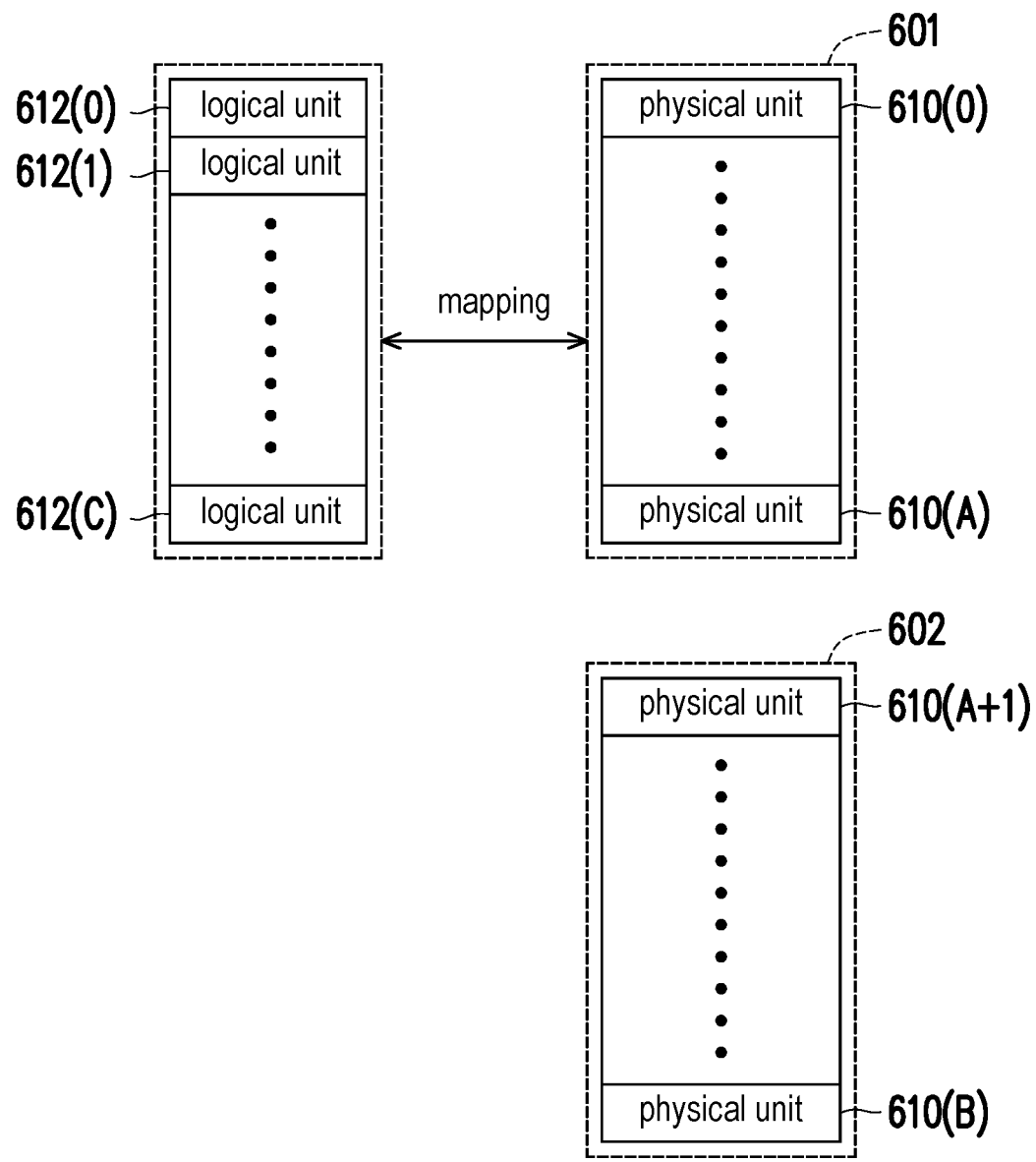
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 502 can logically group the physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace the damaged physical units in the storage area 601. For example, if the data read from a certain physical unit contains too many errors to be corrected, this physical unit will be regarded as a damaged physical unit. It should be noted that if there is no available physical erasing unit in the replacement area 602, the memory management circuit 502 may declare the entire memory storage device 10 as a write protect state, and can no longer be written with data.

In this exemplary embodiment, each physical unit refers to a physical erasing unit. However, in another exemplary embodiment, a physical unit may also refer to a physical address, a physical programming unit, or formed by a plurality of continuous or discontinuous physical addresses. The memory management circuit 502 will configure the logical units 612(0) to 612(C) to map the physical units 610(0) to 610(A) in the storage area 601. In this exemplary embodiment, each logical unit refers to a logical address. However, in another exemplary embodiment, a logical unit may also refer to a logic programming unit, a logic erasing unit, or formed by a plurality of continuous or discontinuous logic addresses. Furthermore, each of the logical units 612(0) to 612(C) may be mapped to one or a plurality of physical units.

The memory management circuit 502 can record the mapping relationship between the logical unit and the physical unit (also referred to as the logical-to-physical address mapping relationship) in at least one logical-to-physical address mapping table. When the host system 11 is to read data from the memory storage device 10 or write data to the memory storage device 10, the memory management circuit 502 can perform access operation on the data of the memory storage device 10 according to the logical-to-physical address mapping table.

In an exemplary embodiment, the rewritable non-volatile memory module 406 may include a plurality of memory dies, which are the basic units for receiving and executing commands from the memory control circuit unit 404. Different memory dies can receive and execute different commands simultaneously, but one memory die can only execute one command at a time. If the memory management circuit 502 writes data to a certain physical programming unit in the memory die, the memory management circuit 502 cannot read data from other physical programming units of the memory die simultaneously. Therefore, in order to determine whether the memory die is busy, the memory management circuit 502 can use status polling to repeatedly transmit status requests to the memory die at a specific frequency or interval polling time to determine whether the memory die is busy.

In an exemplary embodiment, after receiving the command from the host, the memory management circuit 502 transmits the corresponding command sequence to the rewritable non-volatile memory module 406 according to the command from the host, and periodically transmits a status request corresponding to the command sequence to the rewritable non-volatile memory module 406 at a fixed time interval to check the status of the memory. In particular, if the rewritable non-volatile memory module 406 includes a plurality of memory dies, the memory management circuit 502 can transmit a status request corresponding to the specific memory die to the memory die whose status is to be acquired.

Figure 7:
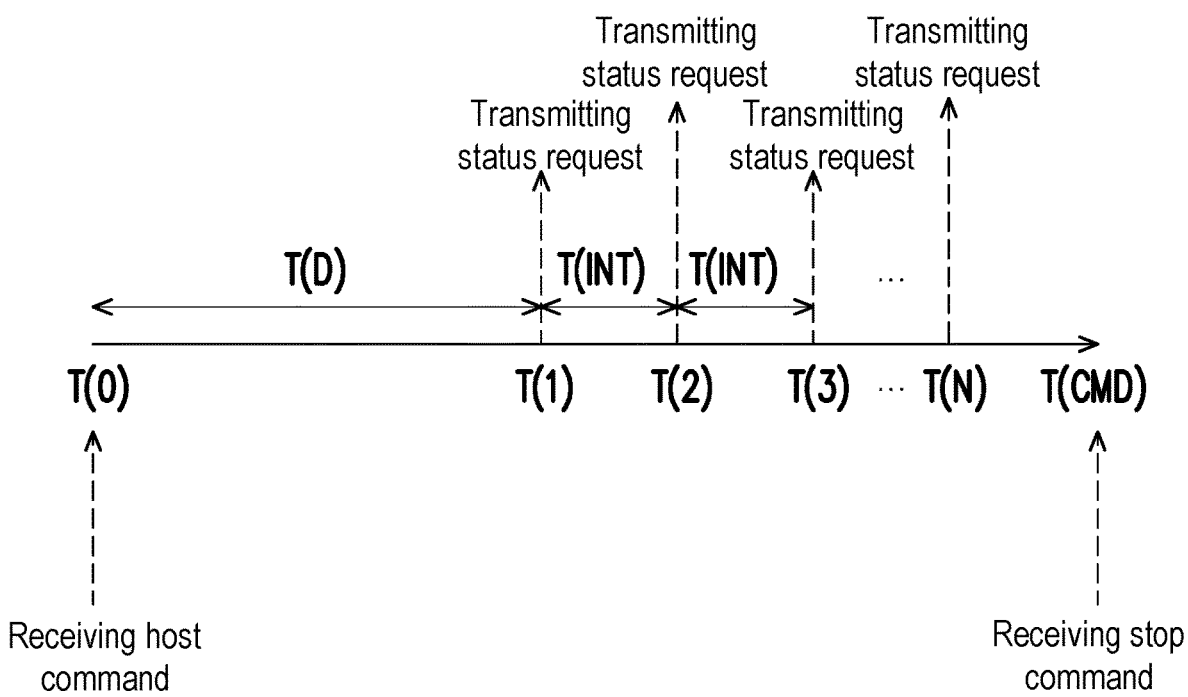
FIG. 7 is a schematic diagram of transmitting a polling request according to an exemplary embodiment of the disclosure.

FIG. 7 is a schematic diagram of transmitting a polling request according to an exemplary embodiment of the disclosure. Referring to FIG. 7, after the memory management circuit 502 receives the host command at time T(0) and transmits the command sequence corresponding to the host command to the rewritable non-volatile memory module 406, the memory management circuit 502 waits for a delay time T(D) before transmitting the status request to the rewritable non-volatile memory module 406. Therefore, after the delay time T(D) has elapsed, the memory management circuit 502 can transmit the first status request to the rewritable non-volatile memory module 406 at the time point T(1) to determine whether the rewritable non-volatile memory module 406 has completed the command. If the command completion status is not returned by the rewritable non-volatile memory module 406 within the polling interval time (for example, the polling interval time T(INT) in FIG. 7) after the time point T(1), the memory management circuit 502 will transmit a second status request to the rewritable non-volatile memory module 406 (i.e., the time point T(2) in FIG. 7). Moreover, the rewritable non-volatile memory module 406 can receive the status request and transmit a reply message to the memory management circuit 502 to respond to the status request. In an exemplary embodiment, the memory management circuit 502 will continue to transmit the status request until it is determined that the status of the rewritable non-volatile memory module 406 is the ready status or the stop command is received at the time point T (CMD).

However, the memory management circuit 502 continuously transmits status requests to read the data of the memory after receiving the host command, which will affect the energy consumption of the memory storage device 10. As the amount of information stored in each memory cell increases, the corresponding busy time also increases. Moreover, the manufacturing batch of the memory die, the type of host command, and access mode will also affect the busy time of the command. On basis of the above, the disclosure provides a memory polling method that can dynamically adjust the polling time more accurately. Specifically, the delay time T(D) may depend on the type of the host command, the statistical distribution of the busy time of the rewritable non-volatile memory module 406, and the access mode, and the disclosure is not limited thereto. Here, the busy time of the rewritable non-volatile memory module 406 is denoted as a time range between, for example, a time point T(0) in FIG. 7 to a time point when it is determined that the status of the rewritable non-volatile memory module 406 is in the standby status.

In an exemplary embodiment, the memory management circuit 502 recognizes the physical programming unit that uses the first access mode as the first type of physical programming unit, and recognizes the physical programming unit that uses the second access mode as the second type of physical programming unit. If a physical programming unit uses the first access mode (also referred to as multi-layer memory cell mode, such as TLC mode), each memory cell in this physical programming unit stores a first amount of bit data, and the first number is not less than 2. For example, in this exemplary embodiment, the first number is 2 or 3. In this exemplary embodiment, the second access mode may be a single-layer memory cell mode (SLC mode), and the disclosure is not limited thereto. If a physical programming unit uses a SLC mode, each memory cell in this physical programming unit only stores one bit of data. In this exemplary embodiment, the reliability of the physical programming unit using the first access mode is generally lower than that of the physical programming unit using the second access mode.

In an exemplary embodiment, the memory management circuit 502 receives a command from the host system, and can determine the initial delay time according to the type of the host command or the access mode of the physical unit. The types of commands are, for example, divided into write commands, erase commands, read commands, and other commands. Next, the memory management circuit 502 will transmit a plurality of status requests to the rewritable non-volatile memory module 406 after the initial delay time. Specifically, after the initial delay time has elapsed, the memory management circuit 502 may periodically transmit a plurality of status requests corresponding to the command sequence at a preset polling interval time (for example, 0.5 to a few microseconds) to the rewritable non-volatile memory module 406.

In an exemplary embodiment, the memory management circuit 502, for example, obtains the delay time and the polling interval time from a look-up table stored in advance. The look-up table stores the delay time and polling interval time corresponding to various types of memory cell and command. The memory management circuit 502 can input the type of memory cell and the type of command into the look-up table to find the corresponding delay time and polling interval time, and determine the time to transmit the status request according to the acquired delay time and the polling interval time.

In an exemplary embodiment, the memory management circuit 502 detects the busy time corresponding to various physical units when executing a plurality of first commands. The first command is, for example, a write command, an erase command, or a read command, the disclosure provides no limitation thereto. For example, the memory management circuit 502 detects the busy time corresponding to various physical erasing units when executing a plurality of first commands. Alternatively, the memory management circuit 502 can also detect the busy time corresponding to various physical programming units when executing a plurality of first commands, and the disclosure is not limited thereto.

In an exemplary embodiment, the memory management circuit 502 counts a plurality of busy times to generate a count statistic value, and determines the delay time according to the count statistic value. The count statistic value may be the mode or median of a plurality of busy times, and the disclosure is not limited thereto. The memory management circuit 502 can record the busy time instantly during the operation of the memory storage device. In this exemplary embodiment, the memory management circuit 502 can determine the frequency for updating the delay time according to the preset count of command executions or the preset time period, which is not limited by the disclosure. The preset count of command executions is the count of completed command executions. For example, the preset count of command executions may be performing 10,000 times of command executions.

In an exemplary embodiment, the memory management circuit 502 can detect the busy time corresponding to various physical programming units when executing the write command. Moreover, the memory management circuit 502 calculates the average count of busy times corresponding to the physical programming units logically belonging to the same physical erasing unit, and sets the average count as the busy time corresponding to the physical erasing unit. Then, the memory management circuit 502 can count the busy times corresponding to these physical erasing units to generate a count statistic value. The count statistic value is, for example, the mode or median of the busy times corresponding to these physical erasing units.

For example, Table 1 below shows the statistical results of the busy time corresponding to the physical erasing unit using the SLC mode when the write command is executed. Please refer to Table 1 below. In Table 1, the first column is busy time, the second column is the number of physical erasing units, and the third column is the proportion of busy time. Referring to Table 1, it can be seen that the mode or median of the busy time corresponding to the physical erasing unit all falls into the group where the busy time is 190 microseconds. On basis of the above, the memory management circuit 502 can set the delay time of transmitting the status request to 190 microseconds when executing the write command on the physical erasing unit using the SLC mode. In this exemplary embodiment, about 65% of the delay time is accurate. Furthermore, only about 25% of the busy status check is delayed by about 2 microseconds, and about 10% of the busy status check requires an additional status request to confirm whether the rewritable non-volatile memory module 406 is in a busy state. In this way, this embodiment provides a relatively balanced delay time for busy status check.

TABLE 1

| Busy time (μs) | Number of physical erasing units | Percentage |
|---|---|---|
| 188 | 3650 | 24.38% |
| 190 | 9650 | 64.45% |
| 192 | 518 | 3.46% |
| 194 | 399 | 2.66% |
| 196 | 390 | 2.60% |
| 198 | 254 | 1.70% |
| 200 | 111 | 0.74% |

In an exemplary embodiment, the memory management circuit 502 can detect the busy times corresponding to various physical programming units when executing the write command. Moreover, the memory management circuit 502 can count the busy times corresponding to these physical programming units to generate a count statistic value. The count statistic value is, for example, the mode or median of the busy times corresponding to these physical programming units.

For example, Table 2 below shows the statistical results of the busy time corresponding to the physical programming unit using the SLC mode when the write command is executed. Please refer to Table 2 below. In Table 2, the first column is busy time, the second column is the number of physical programming units, and the third column is the proportion of busy time. Referring to Table 2, it can be seen that the median of the busy time corresponding to the physical programming unit falls in the group where the busy time is 190 microseconds, and the mode falls in the group where the busy time is 191 microseconds. On basis of the above, the memory management circuit 502 can set the delay time of transmitting the status request to 190 microseconds or 191 microseconds when executing the write command on the physical programming unit using the SLC mode.

TABLE 2

| Busy time (μs) | Number of physical programming units | Percentage |
|---|---|---|
| 188 | 62 | 0.17% |
| 189 | 10625 | 29.13% |
| 190 | 9959 | 27.30% |
| 191 | 12629 | 34.62% |
| 192 | 3178 | 8.71% |
| 193 | 27 | 0.07% |

In an exemplary embodiment, the memory management circuit 502 can set at least one of the mode and the median of a plurality of busy times corresponding to a plurality of physical units to a delay time according to the product characteristics of the memory storage device 10. For example, assuming that the product is characterized as a product with low power consumption, the memory management circuit 502 can set the delay time of transmitting the status request to a longer busy time among the mode and median of the busy time when executing the write command on the physical unit. In terms of the embodiment in Table 2 above, the delay time can be set to 191 microseconds. Here, when the memory management circuit 502 transmits the first status request after the delay time, in 90% of time, the rewritable non-volatile memory module 406 is in the standby status, thus saving efficacy required for transmitting additional status requests. In addition, if the product is characterized as an efficiency-prioritized product, the memory management circuit 502 can set the delay time of transmitting the status request to the shorter busy time among the mode and median of the busy time when executing the write command on the physical unit. In terms of the embodiment in Table 2 above, the delay time can be set to 190 microseconds. In this way, this exemplary embodiment provides a more balanced delay time for performing busy status check.

It should be noted that the operation of counting the busy time of the physical unit may be counting the command execution result for a single memory die, and may be counting the command execution result for all memory dies, the disclosure is not limited thereto.

In this exemplary embodiment, the memory storage device 10 can store the delay time T(D), the polling interval time T(INT), the busy time, and the above statistical results for the memory management circuit 502 to further process or use. In different embodiments, such information can be stored in the random access memory in the memory management circuit, the buffer memory 510 or the rewritable non-volatile memory module 406, and the disclosure is not limited thereto.

It should be mentioned that, according to the above embodiments, the memory management circuit 502 can respectively detect the busy time corresponding to the physical unit associated with different types of command and access mode with respect to the type of command of the host command and the access mode of the physical unit (for example, detecting the busy time of a physical unit that uses SLC mode when executing an erase command), thereby generating a count statistic value of the physical unit associated with different types of command and access mode. For example, the example in Table 3 shows that the memory management circuit 502 can detect and record the following 6 busy times.

TABLE 3

| Access mode | Type of command |
|---|---|
| SLC | Erase command |
| SLC | Write command |
| SLC | Read command |
| TLC | Erase command |
| TLC | Write command |
| TLC | Read command |

Figure 8:
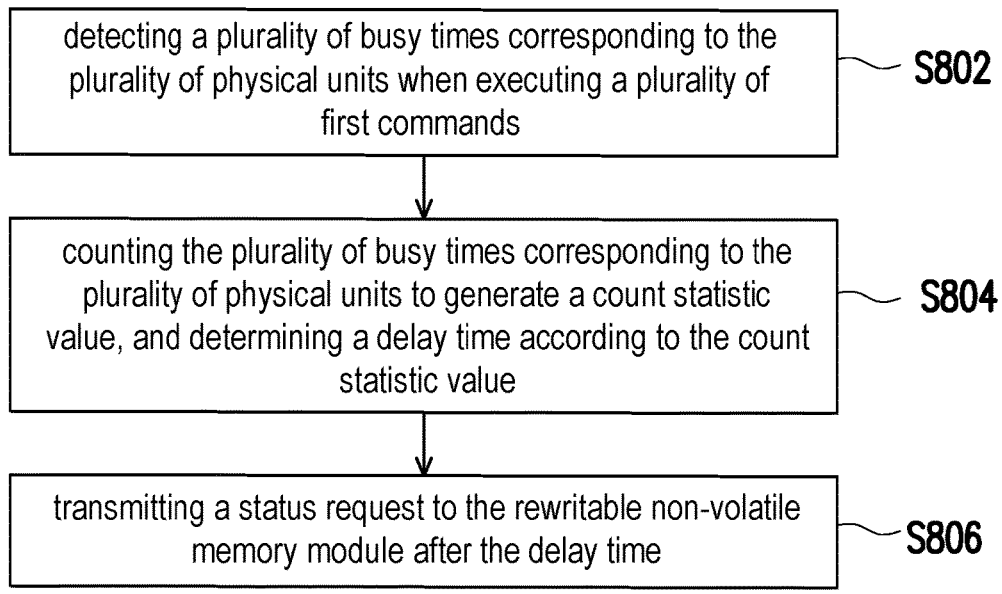
FIG. 8 is a flowchart of a memory polling method according to an exemplary embodiment of the disclosure.

FIG. 8 is a flowchart of a memory polling method according to an exemplary embodiment of the disclosure. Referring to FIG. 8, in step S802, a plurality of busy times corresponding to a plurality of physical units are detected when a plurality of first commands are executed. In step S804, a plurality of busy times corresponding to a plurality of physical units are counted to generate a count statistic value, and the delay time is determined according to the count statistic value. In step S806, after the delay time, a status request is sent to the rewritable non-volatile memory module.

However, each step in FIG. 8 has been described in detail as above, and no further description is incorporated herein. It should be noted that each step in FIG. 8 can be implemented as a plurality of program codes or circuits, and the disclosure is not limited thereto. In addition, the method in FIG. 8 can be used in conjunction with the above exemplary embodiments, or can be used alone, and the disclosure is not limited thereto.

In summary, the memory polling method, memory storage device, and memory control circuit unit provided by the disclosure can instantly detect the busy time corresponding to the physical unit when executing the command when the memory storage device is operating. By dynamically updating the delay time of transmitting the status request according to the busy time, this embodiment can make the delay time more accurately conform to the actual status of the current memory storage device. In this way, the count and time of polling the memory status while waiting for the command to be completed can be reduced, thereby reducing the power consumption of the memory storage device and reducing the generation of heat, thereby decreasing the temperature of the memory storage device.

Although the present disclosure has been disclosed as above in the embodiments, it is not intended to limit the disclosure. Anyone with ordinary knowledge in the technical field can make some changes and modification without departing from the spirit and scope of the disclosure. Therefore, the scope to be protected by the disclosure shall be subject to the scope of the appended claims.

What is claimed is:

1. A memory polling method, adapted for a memory storage device, the memory storage device comprising a rewritable non-volatile memory module, the rewritable non-volatile memory module comprising a plurality of physical units, and the memory polling method comprising:
    detecting a plurality of busy times corresponding to the plurality of physical units associated with types of command of a plurality of first commands and access mode of the plurality of physical units when executing the plurality of first commands, wherein the access mode includes TLC mode and SLC mode;
    counting the plurality of busy times corresponding to the plurality of physical units;
    setting the delay time to a longer busy time among the mode and median of the busy times according to the memory storage device being characterized as a product with low power consumption; and
    transmitting a status request to the rewritable non-volatile memory module after the delay time.

2. The memory polling method according to claim 1, wherein the first command comprises at least one of a write command, an erase command, and a read command.

3. The memory polling method according to claim 1, wherein the plurality of physical units comprise a plurality of physical programming units, and the step of counting the plurality of busy times corresponding to the plurality of physical units to generate the count statistic value comprises:
    calculating an average count of the plurality of busy times corresponding to the plurality of physical programming units that logically belong to a same physical erasing unit, and setting the average count to be a busy time corresponding to the physical erasing unit; and
    counting the plurality of busy times corresponding to the plurality of physical erasing units to generate the count statistic value.

4. The memory polling method according to claim 1, wherein the plurality of physical units comprise a plurality of physical programming units, and the step of counting the plurality of busy times corresponding to the plurality of physical units to generate the count statistic value comprises:
    counting the plurality of busy times corresponding to the plurality of physical programming units to generate the count statistic value.

5. The memory polling method according to claim 1, wherein the memory polling method further comprises:
    determining a frequency of updating the delay time according to a preset count of command executions or a preset time period, wherein the preset count of command executions is the count of completed command executions.

6. A memory storage device, comprising:
    a connection interface unit, configured for coupling to a host system;
    a rewritable non-volatile memory module, comprising a plurality of physical units; and a memory control circuit unit, coupled to the connection interface unit and the rewritable non-volatile memory module, wherein the memory control circuit unit is configured to detect a plurality of busy times corresponding to the plurality of physical units associated with types of command of a plurality of first commands and access mode of the plurality of physical units when executing the plurality of first commands, wherein the access mode includes TLC mode and SLC mode, the memory control circuit unit is further configured to count the plurality of busy times corresponding to the plurality of physical units, the memory control circuit unit is further configured to set the delay time to a longer busy time among the mode and median of the busy times according to the memory storage device being characterized as a product with low power consumption, and the memory control circuit unit is further configured to transmit a status request to the rewritable non-volatile memory module after the delay time.

7. The memory storage device according to claim 6, wherein the first command comprises at least one of a write command, an erase command, and a read command.

8. The memory storage device according to claim 6, wherein the plurality of physical units comprise a plurality of physical programming units, and the operation of counting the plurality of busy times corresponding to the plurality of physical units to generate the count statistic value comprises:

calculating an average count of the plurality of busy times corresponding to the plurality of physical programming units that logically belong to a same physical erasing unit, and setting the average count to be a busy time corresponding to the physical erasing unit; and counting the plurality of busy times corresponding to the plurality of physical erasing units to generate the count statistic value.

9. The memory storage device according to claim 6, wherein the plurality of physical units comprise a plurality of physical programming units, and the operation of counting the plurality of busy times corresponding to the plurality of physical units to generate the count statistic value comprises:

counting the plurality of busy times corresponding to the plurality of physical programming units to generate the count statistic value.

10. The memory storage device according to claim 6, wherein the memory control circuit unit is further configured to determine a frequency of updating the delay time according to a preset count of command executions or a preset time period, wherein the preset count of command executions is the count of completed command executions.

11. A memory control circuit unit, configured to control a memory storage device comprising a rewritable non-volatile memory module, the rewritable non-volatile memory module comprising a plurality of physical units, and the memory control circuit unit comprising:

a host interface, configured for coupling to a host system;

a memory interface, configured for coupling to the rewritable non-volatile memory module; and a memory management circuit, coupled to the host interface and the memory interface, wherein the memory management circuit is configured for detecting a plurality of busy times corresponding to the plurality of physical units associated with types of command of a plurality of first commands and access mode of the plurality of physical units when executing the plurality of first commands, wherein the access mode includes TLC mode and SLC mode, the memory management circuit is further configured to count the plurality of busy times corresponding to the plurality of physical units, the memory management circuit is further configured to set the delay time to a longer busy time among the mode and median of the busy times according to the memory storage device being characterized as a product with low power consumption, and the memory management circuit is further configured to transmit a status request to the rewritable non-volatile memory module after the delay time.

12. The memory control circuit unit according to claim 11, wherein the first command comprises at least one of a write command, an erase command, and a read command.

13. The memory control circuit unit according to claim 11, wherein the plurality of physical units comprise a plurality of physical programming units, and the operation of counting the plurality of busy times corresponding to the plurality of physical units to generate the count statistic value comprises:

calculating an average count of the plurality of busy times corresponding to the plurality of physical programming units that logically belong to a same physical erasing unit, and setting the average count to be a busy time corresponding to the physical erasing unit; and counting the plurality of busy times corresponding to the plurality of physical erasing units to generate the count statistic value.

14. The memory control circuit unit according to claim 11, wherein the plurality of physical units comprise a plurality of physical programming units, and the operation of counting the plurality of busy times corresponding to the plurality of physical units to generate the count statistic value comprises:

counting the plurality of busy times corresponding to the plurality of physical programming units to generate the count statistic value.

15. The memory control circuit unit according to claim 11, wherein the memory management circuit is further configured to determine a frequency of updating the delay time according to a preset count of command executions or a preset time period, wherein the preset count of command executions is the count of completed command executions.

16. A memory polling method, adapted for a memory storage device, the memory storage device comprising a rewritable non-volatile memory module, the rewritable non-volatile memory module comprising a plurality of physical units, and the memory polling method comprising:

detecting a plurality of busy times corresponding to the plurality of physical units associated with types of command of a plurality of first commands and access mode of the plurality of physical units when executing the plurality of first commands, wherein the access mode includes TLC mode and SLC mode;

counting the plurality of busy times corresponding to the plurality of physical units;

setting the delay time to a shorter busy time among the mode and median of the busy times according to the memory storage device being characterized as an efficiency-prioritized product; and transmitting a status request to the rewritable non-volatile memory module after the delay time.

17. A memory storage device, comprising:

a connection interface unit, configured for coupling to a host system;

a rewritable non-volatile memory module, comprising a plurality of physical units; and a memory control circuit unit, coupled to the connection interface unit and the rewritable non-volatile memory module, wherein the memory control circuit unit is configured to detect a plurality of busy times corresponding to the plurality of physical units associated with types of command of a plurality of first commands and access mode of the plurality of physical units when executing the plurality of first commands, wherein the access mode includes TLC mode and SLC mode, the memory control circuit unit is further configured to count the plurality of busy times corresponding to the plurality of physical units, the memory control circuit unit is further configured to set the delay time to a shorter busy time among the mode and median of the busy times according to the memory storage device being characterized as an efficiency-prioritized product, and the memory control circuit unit is further configured to transmit a status request to the rewritable non-volatile memory module after the delay time.

18. A memory control circuit unit, configured to control a memory storage device comprising a rewritable non-volatile memory module, the rewritable non-volatile memory module comprising a plurality of physical units, and the memory control circuit unit comprising:

a host interface, configured for coupling to a host system;

a memory interface, configured for coupling to the rewritable non-volatile memory module; and a memory management circuit, coupled to the host interface and the memory interface, wherein the memory management circuit is configured for detecting a plurality of busy times corresponding to the plurality of physical units associated with types of command of a plurality of first commands and access mode of the plurality of physical units when executing the plurality of first commands, wherein the access mode includes TLC mode and SLC mode, the memory management circuit is further configured to count the plurality of busy times corresponding to the plurality of physical units, the memory management circuit is further configured to set when the delay time to a shorter busy time among the mode and median of the busy times according to the memory storage device being characterized as an efficiency-prioritized product, and the memory management circuit is further configured to transmit a status request to the rewritable non-volatile memory module after the delay time.

* * * * *